(12) United States Patent
DeVlieg

(10) Patent No.: US 8,459,590 B2
(45) Date of Patent: Jun. 11, 2013

(54) LANDING GEAR STRUT EXTENDER

(75) Inventor: Garrett H. DeVlieg, Bellevue, WA (US)

(73) Assignee: Hydro-Aire, Inc., Burbank, CA (US)

( * ) Notice: Subject to any disclaimer, the term of this patent is extended or adjusted under 35 U.S.C. 154(b) by 977 days.

(21) Appl. No.: 11/717,904

(22) Filed: Mar. 13, 2007

(65) Prior Publication Data

US 2010/0133379 A1   Jun. 3, 2010

Related U.S. Application Data

(60) Provisional application No. 60/783,259, filed on Mar. 17, 2006.

(51) Int. Cl.
*B64C 25/00* (2006.01)
*B64C 25/58* (2006.01)

(52) U.S. Cl.
USPC .............................. 244/104 FP; 244/102 SS

(58) Field of Classification Search
USPC ................. 244/100 R, 102 A, 102 SS, 102 R, 244/104 FP
See application file for complete search history.

(56) References Cited

U.S. PATENT DOCUMENTS

| | | | | |
|---|---|---|---|---|
| 2,106,289 A | * | 1/1938 | Wallace | 244/102 SS |
| 2,294,918 A | * | 9/1942 | Levy | 244/102 SS |
| 2,735,634 A | * | 2/1956 | Fosness | 244/104 FP |
| 3,327,974 A | * | 6/1967 | Nicholl | 244/100 R |
| 3,826,450 A | * | 7/1974 | Currey et al. | 244/103 R |
| 3,954,232 A | * | 5/1976 | Harper | 244/102 R |
| 3,981,462 A | * | 9/1976 | Berezhnoi et al. | 244/100 A |
| 4,004,762 A | * | 1/1977 | Jenkins | 244/104 FP |
| 4,291,850 A | * | 9/1981 | Sharples | 244/102 SS |
| 4,634,082 A | * | 1/1987 | Kendall | 244/100 R |
| 4,869,444 A | | 9/1989 | Ralph | |
| 5,460,340 A | * | 10/1995 | White | 244/102 A |
| 6,293,141 B1 | | 9/2001 | Nance | |
| 6,474,598 B2 | | 11/2002 | Carter, Jr. | |
| 6,575,405 B2 | * | 6/2003 | Bryant et al. | 244/102 SL |

* cited by examiner

*Primary Examiner* — Philip J Bonzell
(74) *Attorney, Agent, or Firm* — Fulwider Patton LLP

(57) ABSTRACT

A mechanism for increasing the ride height of aircraft by selectively increasing the hydraulic fluid content within landing gear struts. By increasing the hydraulic fluid volume within a strut, the strut is lengthened without adversely affecting its spring rate while the ability to withdraw fluid from a strut maintains the ability of the strut to absorb the impact of landing. The mechanism is readily retrofitable to existing landing gear systems to accommodate more efficient under the wing intake designs and to reduce the likelihood of FOD during taxiing at minimal cost and with very a minimal increase in the aircraft weight.

2 Claims, 1 Drawing Sheet

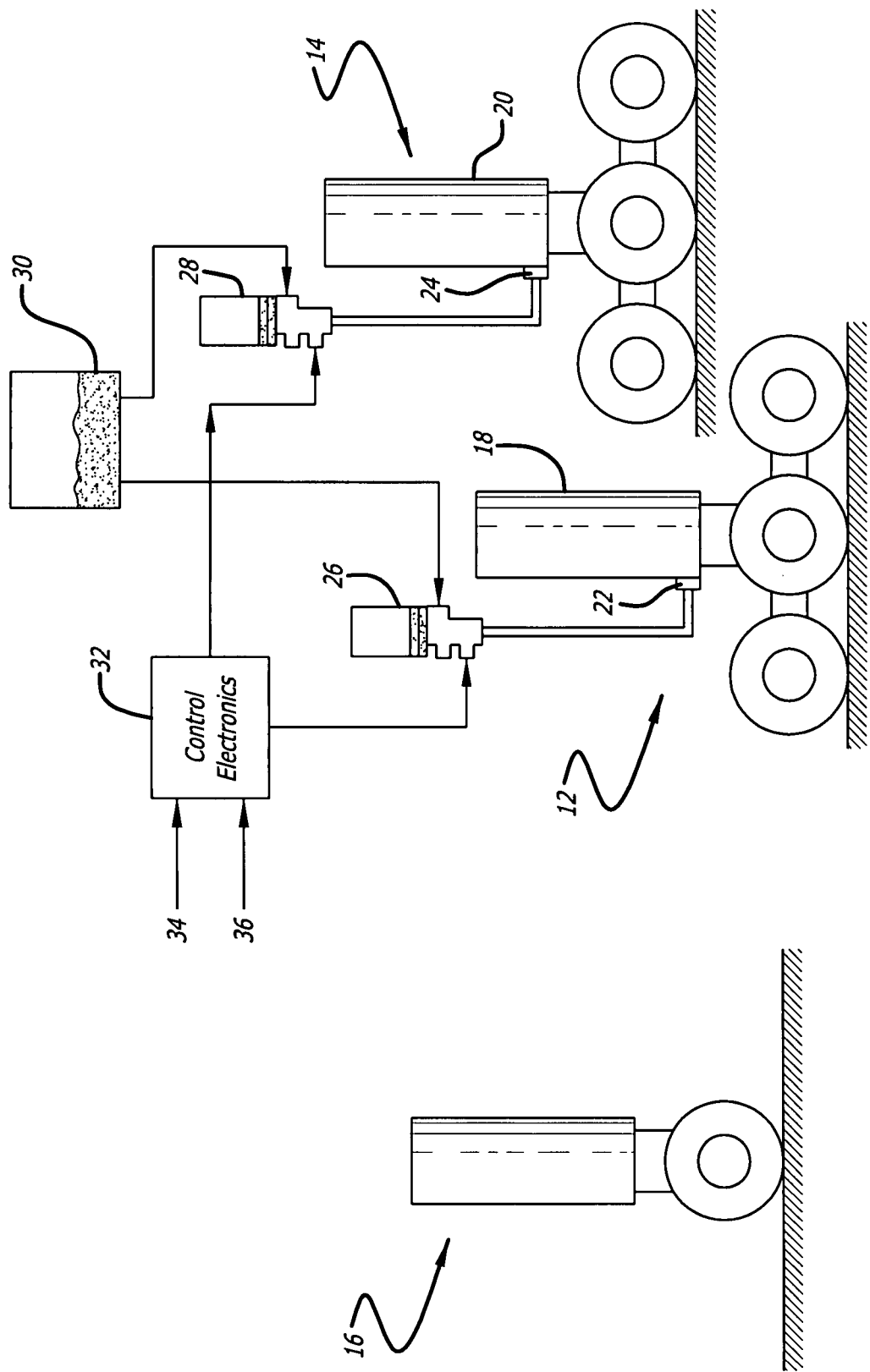

LANDING GEAR STRUT EXTENDER

CROSS-REFERENCES TO RELATED APPLICATIONS

This application is based upon and claims priority from U.S. Provisional Application No. 60/783,259, filed Mar. 17, 2006.

BACKGROUND OF THE INVENTION

The present invention generally relates to aircraft landing gear and more particularly pertains to landing gear with adjustable ride height.

In the design of an aircraft having engines mounted under the wing, the landing gear must be sufficiently long in order to provide adequate engine ground clearance. Additional length allows the engine inlets to be designed for more economical operation in flight (i.e. less drag) and the engines themselves would be less prone to damage during on-ground operations due to the ingestion of FOD (Foreign Object Damage). However, a longer landing gear adds considerable weight and some expense to the aircraft. This is particularly true when modifying an existing aircraft design to stretch the fuselage or add larger diameter engines, etc., because revising an existing landing gear configuration in order to gain length would be extremely expensive as well as add considerable weight.

It is therefore desirable to be able to temporarily lengthen a landing gear for purposes such as liftoff rotation or engine ground clearance without actually making the landing gear itself larger or heavier. Additionally, it would desirable to be able to temporarily lengthen the landing gear without adversely affecting its spring rate.

SUMMARY OF THE INVENTION

Large aircraft landing gear structures typically employ a shock strut or equivalent means that is fully extended when the aircraft is in flight, and which compresses approximately 18 to 24 inches when the aircraft is on the ground. These shock struts typically contain pressurized oil to flow through orifices for shock absorbing and compressed gas to support the aircraft weight and provide the equivalent of a "suspension spring" for ride quality. When taxiing on the ground, the aircraft weight in the absence of aerodynamic lift compresses the struts such that they are nearly fully compressed.

In one presently preferred embodiment of the invention a fluid pump, reservoir, and control valves are connected to the portion of the strut that contains the oil (typically the "lower strut servicing port") with which oil is pumped into or out of the strut, depending upon whether it is desirable to inject fluid into the strut to lengthen it for on-ground operations or remove oil from the strut in preparation for absorbing the landing impact energy.

Injecting fluid into the strut: Normally, when taxiing on the ground the landing gear strut is nearly fully compressed by the aircraft weight that it is supporting. An apparatus according to the present invention would inject fluid into the strut after landing as the full weight of this aircraft is supported by the struts. Adding fluid to the strut causes the strut to extend, but does not change the volume of gas in the strut and hence does not change the characteristics of the spring rate of the gas. Lengthening the strut provides more ground clearance for the engines, thus allowing a more efficient inlet design and less exposure to FOD damage. The shock absorbing and taxi "handling" of the strut are not affected because the added oil is essentially incompressible and the gas volume (which provides the shock absorbing "spring") is not changed.

Withdrawing fluid from the strut: Normally, when the aircraft is in flight, the landing gear strut is fully extended by the gas pressure inside the strut, and the oil volume is set to a level that allows full stroke at landing for absorbing the landing impact. The invention withdraws the fluid that had been injected into the strut for on-ground operations when the aircraft is in a landing configuration, thus restoring it to "normal" oil content for the landing impact. Accordingly, the touchdown shock absorbing characteristics of the strut are unchanged.

The invention offers the advantage of providing a longer landing gear for certain operations of the aircraft where that is desirable, without having to pay the cost and weight of a longer landing gear. This is particularly true with respect to the ability to design a more fuel-efficient engine inlet and reduce costly FOD damage to engines. In addition, the invention allows the amount of fluid in the gear to be optimized for various weight and temperature conditions which may allow further weight saving and performance advantages to the aircraft.

These and other advantages will become apparent from the following detailed description of a preferred embodiment which, taken in conjunction with the drawings, illustrates by way of example the principles of the invention.

BRIEF DESCRIPTION OF THE DRAWINGS

FIGURE 1 is a schematic diagram of a landing gear system according to the invention.

DETAILED DESCRIPTION OF THE PREFERRED EMBODIMENTS

FIGURE 1 illustrates a preferred embodiment of the present invention. The illustrated device provides for the adjustment of the ride height of an aircraft. More particularly, the device allows the landing gear to be lengthened or shortened when desired and does so without affecting the spring rate. Additionally, the device may be retrofitted to existing aircraft with minimal effort and cost.

In the embodiment illustrated in the FIGURE, the device of the present invention is shown fitted to an aircraft's two main landing gear 12, 14, while the nose gear 16 remains unmodified. Each landing gear includes a strut 18, 20 that includes a piston slidably received within a cylinder. The strut contains both oil as well as a gas and is configured in the conventional manner wherein compression of the piston into the cylinder simultaneously causes the gas to be compressed and the oil to flow through restrictive flowpaths. The gas thereby serves as a spring to support the load exerted on the strut while the restricted oil flow serves to dampen the movement of the piston within the cylinder. Additionally, the volume of oil within the cylinder determines the overall length of the strut as the oil is incompressible In accordance with the present invention, oil may be added to or removed from the strut via the lower servicing port 22, 24. Oil from a remote reservoir 30 is pumped into or pumped out of the struts by a pump 26, 28. Alternatively, a motor-operated actuator designed to act as a syringe, or any other number of simple means to inject and withdraw fluid can be employed. The pump is controlled by a controller 32 that may be configured to receive input from any of a number of sources including, but not limited to, an Aircraft Data System 34 and Aircraft Air/Ground Status indication 36.

The aircraft logic for injecting and withdrawing fluid from the strut can be simple "air-ground" logic that is commonly available on virtually all aircraft. In "ground mode" the system injects fluid into the strut to lengthen it, and in "air mode" the system withdraws the fluid that had been injected in preparation for landing. Additional sophistication can be added to the system to optimize the amount of fluid injected and withdrawn according to aircraft gross weight and gas temperature so that optimum landing gear performance characteristics are achieved over a wide variety of operational variables, thus providing additional advantages to the landing gear design.

While a particular form of the invention has been described and illustrated, it will be apparent to those skilled in the art that various modifications can be made without departing from the spirit and scope of the invention. Accordingly, it is not intended that the invention be limited except by the appended claims.

The invention claimed is:

1. A method of increasing a ride height of an aircraft while taxiing on the ground after landing, said aircraft being supported by one nose gear and two main landing gear, said two main landing gear having extendible struts containing a hydraulic fluid and a quantity of gas, said aircraft including a reservoir with the hydraulic fluid, and pumps connected to the reservoir for pumping the hydraulic fluid from the reservoir into the extendible struts of said two main landing gear, and for withdrawing the hydraulic fluid from said extendible struts of said two main landing gear, comprising the steps of:

increasing the aircraft's ride height while the aircraft is taxiing on the ground after landing by pumping a volume of hydraulic fluid exclusively into the extendible struts of the two main landing gear; and withdrawing said volume of hydraulic fluid from the extendible struts of the two main landing gear when the aircraft is in flight to establish a set amount of hydraulic fluid in the extendible struts of the two main landing gear, and maintaining said set amount of hydraulic fluid in the extendible struts of the two main landing gear during flight of the aircraft preparatory for a landing impact of the aircraft.

2. A method of increasing a ride height of an aircraft while taxiing on the ground after landing, said aircraft being supported by one nose gear and two main landing gear, said two main landing gear having extendible struts containing a hydraulic fluid and a quantity of gas, said aircraft including a reservoir with the hydraulic fluid, and pumps connected to the reservoir for pumping the hydraulic fluid from the reservoir into the extendible struts of said two main landing gear, and for withdrawing the hydraulic fluid from said extendible struts of said two main landing gear, comprising the steps of:

establishing a set amount of hydraulic fluid in the extendible struts of the two main landing gear when the aircraft is in flight, and maintaining said set amount of hydraulic fluid in the extendible struts of the two main landing gear during flight of the aircraft preparatory for a landing impact of the aircraft; and pumping an additional volume of hydraulic fluid exclusively into the extendible struts of the two main landing gear while the aircraft is taxiing on the ground after landing, whereby the aircraft's ride height is increased while the aircraft is taxiing on the ground after landing.

* * * * *